(12) United States Patent
Lee et al.

(10) Patent No.: US 12,506,174 B2
(45) Date of Patent: *Dec. 23, 2025

(54) SOLID ELECTROLYTE MEMBRANE, METHOD FOR MANUFACTURING THE SAME, AND ALL-SOLID-STATE BATTERY COMPRISING THE SAME

(71) Applicants: LG ENERGY SOLUTION, LTD., Seoul (KR); THE REGENTS OF THE UNIVERSITY OF CALIFORNIA, Oakland, CA (US)

(72) Inventors: Jung-Pil Lee, Daejeon (KR); Min-Sang Song, Daejeon (KR); Jiyoung Kim, Daejeon (KR); Dong Ju Lee, La Jolla, CA (US); Zheng Chen, San Diego, CA (US)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,309

(22) Filed: Dec. 20, 2023

(65) Prior Publication Data

US 2025/0210690 A1 Jun. 26, 2025

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0435* (2013.01); *H01M 4/623* (2013.01); *H01M 10/0565* (2013.01); *H01M 10/05* (2013.01)

(58) Field of Classification Search
CPC ......... H01M 10/0562; H01M 10/0565; H01M 10/05; H01M 4/0435; H01M 4/623; H01M 4/04; H01M 4/62
See application file for complete search history.

(56) References Cited

U.S. PATENT DOCUMENTS

| | | | |
|---|---|---|---|
| 2013/0040225 A1* | 2/2013 | Onishi | H01M 8/1044 |
| | | | 429/509 |
| 2013/0260257 A1* | 10/2013 | Choi | H01M 10/056 |
| | | | 429/303 |

(Continued)

FOREIGN PATENT DOCUMENTS

| | | |
|---|---|---|
| CN | 112421114 A | 2/2021 |
| CN | 114243104 A | 3/2022 |

(Continued)

*Primary Examiner* — Adam J Francis
(74) *Attorney, Agent, or Firm* — Birch, Stewart, Kolasch & Birch, LLP

(57) ABSTRACT

Disclosed is a solid electrolyte membrane, a method for manufacturing the same, and an all-solid-state battery including the same. More specifically, the solid electrolyte membrane includes a first solid electrolyte layer including a first solid electrolyte and a first fibrous binder and a second solid electrolyte layer including a second solid electrolyte and a second fibrous binder, stacked adjacent to each other, wherein the weight of the first fibrous binder relative to the total weight of the first solid electrolyte layer is less than the weight of the second fibrous binder relative to the total weight of the second solid electrolyte layer. Since the weight of a first fibrous binder included in the first solid electrolyte layer is less than the weight of the second fibrous binder included in the second solid electrolyte layer, the strength may be improved without lowering the ionic conductivity of the solid electrolyte membrane.

20 Claims, 2 Drawing Sheets

(51) Int. Cl.
 H01M 4/62    (2006.01)
 H01M 10/05   (2010.01)
 H01M 10/0565 (2010.01)

(56) References Cited

U.S. PATENT DOCUMENTS

| | | | |
|---|---|---|---|
| 2020/0028156 A1* | 1/2020 | Zhang | H01M 4/525 |
| 2020/0227783 A1* | 7/2020 | Boskamp | C08J 5/20 |
| 2020/0343580 A1* | 10/2020 | Yushin | H01M 10/0565 |
| 2021/0242490 A1* | 8/2021 | Ku | H01M 4/382 |
| 2022/0028242 A1 | 1/2022 | Hippauf et al. | |
| 2023/0102360 A1* | 3/2023 | Goto | H01M 50/489 |
| | | | 429/322 |
| 2023/0223588 A1* | 7/2023 | Lee | H01M 4/13 |
| | | | 429/306 |
| 2023/0275261 A1* | 8/2023 | Ku | H01M 4/382 |
| | | | 429/317 |
| 2024/0429436 A1 | 12/2024 | Les et al. | |

FOREIGN PATENT DOCUMENTS

| | | |
|---|---|---|
| JP | 2004-206942 A | 7/2004 |
| JP | WO2020/036055 A1 | 2/2020 |
| KR | 10-2016-0085467 A | 7/2016 |
| KR | 10-2021-0098246 A | 8/2021 |
| KR | 10-2021-0113995 A | 9/2021 |
| KR | 10-2023-0036851 A | 3/2023 |
| KR | 10-2022-0048298 A | 8/2025 |

\* cited by examiner

SOLID ELECTROLYTE MEMBRANE, METHOD FOR MANUFACTURING THE SAME, AND ALL-SOLID-STATE BATTERY COMPRISING THE SAME

TECHNICAL FIELD

The present disclosure relates to a solid electrolyte membrane, a method for manufacturing the same, and an all-solid-state battery comprising the same.

BACKGROUND ART

There continues to be an increase in electrified transportation, exemplified by the widespread adoption of electric vehicles (EVs) and the emergence of urban air mobility (UAM) vehicles. Simultaneously, there is a growing demand for stationary energy storage systems, notably in the residential and industrial sectors, powered by solar and wind generators. This shift is driven in part by the pressing need to mitigate the adverse environmental and climate impacts associated with traditional internal combustion engines and other non-renewable means of power generation. Thus, the development of battery technologies with high energy density, while also ensuring enhanced safety, has become an imperative.

From the viewpoint of limitations with respect to capacity, safety, output, large size, miniaturization, etc., of batteries, various batteries that can overcome the limitations of lithium secondary batteries are currently being studied.

On-going studies are being concentrated on different types of batteries. These include metal-air batteries that have large theoretical capacities and all-solid-state batteries that do not have explosion hazards in terms of safety. Also, there are supercapacitors in terms of output, NaS batteries or redox flow batteries (RFB) in terms of large size, and thin film batteries in terms of miniaturization.

The all-solid-state battery refers to a battery in which the liquid electrolyte used in the existing lithium secondary battery is replaced with a solid. Such all-solid-state batteries are safer since they do not use a flammable solvent, so there is no ignition or explosion likelihood caused by the decomposition reaction of a conventional electrolyte solution. In addition, in the case of the all-solid-state battery, since Li metal or Li alloy may be used as a material for the negative electrode, there may be an advantage that the energy density of the battery may be remarkably improved.

In the case of an all-solid-state battery, although safety may be improved by using a solid electrolyte, the ionic conductivity may be reduced. In addition, if a liquid electrolyte is used as a means to secure the ionic conductivity of the solid electrolyte, there may be a problem that the strength is reduced.

In general, in order to ensure the safety of an all-solid-state battery and at the same time prevent the performance and processability of the battery from deteriorating, both the ionic conductivity and strength of the solid electrolyte membrane must be maintained above a certain level.

Among solid electrolyte membranes developed to date, the results of technological development for a solid electrolyte that has both physical properties of ionic conductivity and strength are an area that may be improved. Further, as the demand for all-solid-state batteries increases, there is a need for the development of a solid electrolyte membrane with excellent ionic conductivity and strength.

In addition, within an all-solid-state battery, side reactions may occur at the interface between the solid electrolyte membrane containing a binder and the negative electrode. Such side reactions may result in a decrease in the performance of the battery. Accordingly, there is an increasing demand for solid electrolyte membranes that may prevent side reactions from occurring at the interface with the negative electrode.

PRIOR ART DOCUMENT

Patent Document (Patent Document 1) US Laid-open Patent Publication No. 2020/0028156.

DISCLOSURE

Technical Problem

In order to solve the above problems, the inventors of the present disclosure have conducted various studies. As a result of such studies, it has been confirmed that with a solid electrolyte membrane in which two solid electrolyte layers are stacked, by setting the content of binder contained in one solid electrolyte layer to a lower level, the strength of the solid electrolyte membrane may be improved without decreasing the ionic conductivity, and side reactions at the interface with the negative electrode may be suppressed.

Therefore, it is an object of the present disclosure to provide a solid electrolyte membrane with improved strength without reducing ionic conductivity and a method of manufacturing the same.

It is another object of the present disclosure to provide an all-solid-state battery comprising the solid electrolyte membrane.

Technical Solution

In order to achieve the above objects, the present disclosure provides a solid electrolyte membrane including a first solid electrolyte layer and a second solid electrolyte layer formed on one side of the first solid electrolyte layer,
wherein the first solid electrolyte layer comprises a first solid electrolyte and a first fibrous binder,
wherein the second solid electrolyte layer comprises a second solid electrolyte and a second fibrous binder,
wherein the weight of the first fibrous binder relative to the total weight of the first solid electrolyte layer is less than the weight of the second fibrous binder relative to the total weight of the second solid electrolyte layer, and
wherein the solid electrolyte membrane is substantially free of solvent.

In one aspect of the present disclosure, the weight of the first fibrous binder may be less than 1% by weight based on the total weight of the first solid electrolyte layer.

In one aspect of the present disclosure, the weight of the second fibrous binder may be 0.2 to 2% by weight based on the total weight of the second solid electrolyte layer.

In one aspect of the present disclosure, the first fibrous binder and the second fibrous binder may each independently include at least one selected from the group consisting of polytetrafluoroethylene (PTFE), ethylene-vinyl acetate (EVA), styrene-ethylene-butylene-styrene (SEBS) and copolymers thereof.

In one aspect of the present disclosure, the first solid electrolyte or the second solid electrolyte may be a sulfide-containing solid electrolyte, a halide-containing solid electrolyte, or an oxide-containing solid electrolyte.

In one aspect of the present disclosure, the thickness of the solid electrolyte membrane may be 20 μm to 700 μm.

In one aspect of the present disclosure, the ionic conductivity of the solid electrolyte membrane may be 0.5 to 10 mS/cm.

In one aspect of the present disclosure, the solid electrolyte membrane may be solvent-free.

The present disclosure also relates to a method of manufacturing a solid electrolyte membrane, which includes manufacturing the first solid electrolyte layer and the second solid electrolyte layer, respectively, and then bonding the first solid electrolyte layer and the second solid electrolyte layer,
  wherein the first solid electrolyte layer is prepared by the following steps (A1) and (A2):
  (A1) mixing first solid electrolyte particles and a first binder; and
  (A2) applying the mixture obtained in step (A1) to a calendaring process to form a first film, which is the first solid electrolyte layer,
  wherein the second solid electrolyte layer is prepared by the following steps (B1) and (B2):
  (B1) mixing second solid electrolyte particles and a second binder; and
  (B2) applying the mixture obtained in step (B1) to a calendaring process to form a second film, which is the second solid electrolyte layer,
  wherein the first binder and the second binder are fiberized during mixing to become the first fibrous binder and the second fibrous binder, respectively, and
  wherein the weight of the first fibrous binder relative to the total weight of the first solid electrolyte layer is less than the weight of the second fibrous binder relative to the total weight of the second solid electrolyte layer.

In one aspect of the present disclosure, the temperature of the calendaring process may be 50° C. to 200° C.

In one aspect of the present disclosure, the calendaring process may be performed for 5 to 50 loops.

In one aspect of the present disclosure, the calendaring process may be performed uniaxially or biaxially.

The present disclosure also provides an all-solid-state battery comprising a positive electrode, a negative electrode, and the solid electrolyte membrane disclosed herein interposed between them.

In one aspect of the present disclosure, the first solid electrolyte layer of the solid electrolyte membrane may be adjacent to the negative electrode.

In one aspect of the present disclosure, the first solid electrolyte layer consists of the first solid electrolyte and the first fibrous binder, and the second solid electrolyte layer consists of the second solid electrolyte and the second fibrous binder.

In one aspect of the present disclosure, no solvent is used in the preparation of the first and second solid electrolyte layers.

Another aspect of the present disclosure relates to a method of manufacturing a solid electrolyte membrane, including:
  (1) preparing a first solid electrolyte layer by (a1) mixing first solid electrolyte particles and a first binder, wherein the first binder is fiberized during mixing to become a first fibrous binder, and then (a2) applying the mixture obtained in (a1) to a calendaring process to form the first solid electrolyte layer;
  (2) preparing a second solid electrolyte layer, by (b1) mixing second solid electrolyte particles and a second binder, wherein the second binder is fiberized during mixing to become a second fibrous binder, and then (b2) applying the mixture obtained in (b1) to a calendaring process to form the second solid electrolyte layer,
  (3) bonding the first solid electrolyte layer prepared in (1) and the second solid electrolyte layer prepared in (2),
  wherein a weight of the first fibrous binder relative to a total weight of the first solid electrolyte layer is less than a weight of the second fibrous binder relative to a total weight of the second solid electrolyte layer, and
  wherein no solvent is used in the preparation of the first and second solid electrolyte layers.

In an aspect of the method for manufacturing the solid electrolyte membrane. the weight of the first fibrous binder is 1% by weight or less based on the total weight of the first solid electrolyte layer and the weight of the second fibrous binder is 0.2 to 2% by weight based on the total weight of the second solid electrolyte layer.

In an aspect of the method for manufacturing the solid electrolyte membrane the thickness of the solid electrolyte membrane is 20 μm to 700 μm.

Advantageous Effects

According to the solid electrolyte membrane of the present disclosure, since two solid electrolyte layers containing different contents of binder are each manufactured in a dry manner and then bonded to form a double layer, there may be an effect of improving the strength without lowering the ionic conductivity.

In addition, in the all-solid-state battery including the solid electrolyte membrane of the present disclosure, since the solid electrolyte layer with a lower binder content among the double layers comprised in the solid electrolyte membrane is placed in contact with the negative electrode, there may be an effect of minimizing side reactions at the interface between the solid electrolyte membrane and the negative electrode.

BEST MODE

Hereinafter, the present disclosure will be described in more detail to facilitate understanding of the present disclosure.

The terms and words used in the present specification and claims should not be construed as limited to ordinary or dictionary terms, and should be construed in a sense and concept consistent with the technical idea of the present disclosure, based on the principle that the inventor can properly define the concept of a term to describe his disclosure in the best way possible.

Solid Electrolyte Membrane

The present disclosure relates to a solid electrolyte membrane, wherein the solid electrolyte membrane includes a first solid electrolyte layer and a second solid electrolyte layer, wherein the contents of the binders comprised in the first solid electrolyte layer and the second solid electrolyte layer are different.

Figure 1A:
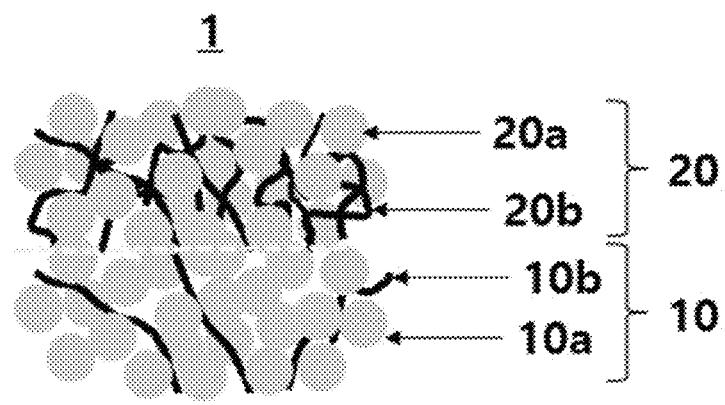
FIG. 1A is a schematic diagram illustrating a longitudinal cross-section of the solid electrolyte membrane according to an aspect of the present disclosure.

FIG. 1A is a schematic diagram illustrating a longitudinal cross-section of the solid electrolyte membrane according to an aspect of the present disclosure.

Referring to FIG. 1A, the solid electrolyte membrane 1 according to an aspect of the present disclosure is a solid electrolyte membrane 1 comprising the first solid electrolyte layer 10 and the second solid electrolyte layer 20 formed on one side of the first solid electrolyte layer 10, wherein the first solid electrolyte layer 10 includes the first solid electrolyte 10a and the first fibrous binder 10b, the second solid electrolyte layer 20 includes the second solid electrolyte 20a and the second fibrous binder 20b, and the weight of the first fibrous binder 10b relative to the total weight of the first solid electrolyte layer 10 is less than the weight of the second fibrous binder 20b relative to the total weight of the second solid electrolyte layer 20.

In one aspect of the present disclosure, the first fibrous binder may be contained in an amount of 1% by weight or less based on the total weight of the first solid electrolyte layer. The first solid electrolyte layer has a lower content of the binder than the adjacent second solid electrolyte layer. For this reason, when manufacturing the all-solid-state battery, if the first solid electrolyte layer is placed to be in contact with the negative electrode, the occurrence of side reactions at the interface with the negative electrode may be prevented.

Specifically, the content of the first fibrous binder may be 1% by weight or less, 0.9% by weight or less, 0.8% by weight or less, 0.7% by weight or less, 0.6% by weight or less, 0.5% by weight or less, 0.4% by weight or less, 0.3% by weight or less, 0.2% by weight or less, or 0.1% by weight or less based on the total weight of the first solid electrolyte layer. If the content of the first fibrous binder exceeds 1% by weight, the ionic conductivity of the solid electrolyte membrane may be decreased, and when the first solid electrolyte layer is placed in contact with the negative electrode inside the all-solid-state battery, the side reactions at the interface with the negative electrode may be further increased. In particular, in the case of PTFE which is a representative fibrous binder, since the reduction reaction occurs near 1.1V, the above problem may become even bigger. The lower limit of the content of the first fibrous binder is not particularly limited, and can, for example, 0.1% by weight or less and greater than 0% by weight based on the total weight of the first solid electrolyte layer.

In one aspect of the present disclosure, the second fibrous binder may be contained in an amount of 2% by weight or less, 1.9% by weight or less, 1.8% by weight or less, 1.7% by weight or less, 1.6% by weight or less, 1.5% by weight or less, 1.4% by weight or less, 1.3% by weight or less, 1.2% by weight or less, 1.1% by weight or less, 1% by weight or less, 0.9% by weight or less, 0.8% by weight or less, 0.7% by weight or less, 0.6% by weight or less, 0.5% by weight or less, or may be contained in an amount of 0.5% by weight or less and 0.2% by weight or more, based on the total weight of the second solid electrolyte layer.

If the content of the second fibrous binder is less than 0.2% by weight, or even less than 0.5% by weight, the strength of the solid electrolyte membrane may be decreased. If the content of the second fibrous binder exceeds 2% by weight, the ionic conductivity of the solid electrolyte membrane may be decreased.

The content of the second fibrous binder may be higher than the content of the first fibrous binder.

In one aspect of the present disclosure, the first fibrous binder and the second fibrous binder may each independently comprise at least one selected from the group consisting of polytetrafluoroethylene (PTFE), ethylene-vinyl acetate (EVA), styrene-ethylene-butylene-styrene (SEBS) and copolymers containing one or more of PTFE, EVA and SEBS. Additionally, the first fibrous binder and the second fibrous binder may be the same or different from each other.

In one aspect of the present disclosure, the first solid electrolyte and the second solid electrolyte may each comprise at least one selected from the group consisting of a sulfide-containing solid electrolyte and a halide-containing solid electrolyte, and they may be the same or different from each other.

The sulfide-containing solid electrolyte may include at least one selected from the group consisting of LiPSX (X=Cl, Br or I), LiGePS, and LiPS. However, the sulfide-containing solid electrolytes are not limited to these, and sulfide-containing solid electrolytes commonly used in this field may be widely used.

Non-limiting examples of the sulfide-containing solid electrolyte may include Li—P—S-based glass, Li—P—S-based glass ceramic and argyrodite-based sulfide-containing solid electrolyte.

Non-limiting examples of the sulfide-containing solid electrolyte may include at least one of $xLi_2S$-$yP_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ or $Li_2S$—$GeS_2$—$ZnS$, $Li6PS5X$ (X=at least one of Cl, Br or I).

In an aspect of the present disclosure, the sulfide-containing solid electrolyte may comprise at least one selected from LPS-based glass or glass ceramic such as $xLi_2S$-$yP_2S_5$, or an argyrodite-based sulfide-containing solid electrolyte ($Li_6PS_5X$; X=Cl, Br, I). In an aspect of the present disclosure, the sulfide-containing solid electrolyte is $Li_6PS_5Cl$.

Additionally, the halide-containing solid electrolyte may be represented by Formula 1 below:

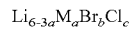    <Formula 1> wherein, M is a metal other than Li, a is 0<a<2, b is 0≤b≤6, c is 0≤c≤6, and b+c=6.

For example, the halide solid electrolyte may include at least one selected from the group consisting of $Li_3YBr_6$, $Li_3YCl_6$ and $Li_3YBr_2Cl_4$.

In addition, since the first solid electrolyte layer and the second solid electrolyte layer are both manufactured by a dry process, the first solid electrolyte layer may include the first solid electrolyte and the first fibrous binder, and the second solid electrolyte layer may include the second solid electrolyte and the second fibrous binder. In one aspect, the first solid electrolyte layer may consist of the first solid electrolyte and the first fibrous binder, and the second solid electrolyte layer may consist of the second solid electrolyte and the second fibrous binder.

In another aspect, no solvent is used in the preparation of the first and second solid electrolyte layers.

In an aspect of the disclosure, the solid electrolyte membrane is substantially free of solvent. The phrase "substantially free" allows for inclusion of minor amounts of solvent, such that the stated objectives of the disclosure may be satisfied. For instance, minor amounts of solvent may be allowed, such as less than 1% by weight based upon a total weight of the solid electrolyte membrane. Included in such amounts are less than 0.95% by weight, less than 0.90% by weight, less than 0.85% by weight, less than 0.80% by weight, less than 0.75% by weight, less than 0.70% by weightless than 0.65% by weight, less than 0.60% by weight, less than 0.55% by weight, less than 0.50% by weight, less than 0.45% by weight, less than 0.40% by weight, less than 0.35% by weight, less than 0.30% by weight, less than 0.25% by weight less than 0.20% by weight, less than 0.15% by weight, less than 0.10% by weight, less than 0.05% by weight, less than 0.02% by weight or less than 0.01% by weight, based on the total weight of the solid electrolyte membrane.

The content of the first solid electrolyte in the first solid electrolyte layer may be 99% by weight or more, 99.1% by weight or more, 99.2% by weight or more, 99.3% by weight or more, 99.4% by weight or more, 99.5% by weight or more, 99.6% by weight or more, 99.7% by weight or more, 99.8% by weight or more, or 99.9% by weight or more. If the content of the first solid electrolyte is less than 99% by weight, the ionic conductivity of the solid electrolyte membrane may be reduced. As the content of the first solid electrolyte is increased, since the content of the first fibrous binder is relatively decreased, the strength of the solid electrolyte membrane may be decreased.

In addition, the content of the second solid electrolyte in the second solid electrolyte layer may be 98% by weight or more, 98.1% by weight or more, 98.2% by weight or more, 98.3% by weight or more, 98.4% by weight or more, 98.5% by weight or more, 98.6% by weight or more, 98.7% by weight or more, 98.8% by weight or more, or 98.9% by weight or more or 99% by weight or more, and may be 99.8% by weight or less. If the content of the second solid electrolyte is less than 98% by weight, the ionic conductivity of the solid electrolyte membrane may be decreased. If the content of the second solid electrolyte exceeds 99.8% by weight, the strength of the solid electrolyte membrane may be decreased.

In one aspect of the present disclosure, the thickness of the solid electrolyte membrane may be 20 μm to 700 μm. If the thickness of the solid electrolyte membrane is less than 20 μm, the strength is weak and thus the processability may be reduced, or a short circuit may occur during assembly and/or operation of the battery. If the thickness of the solid electrolyte membrane exceeds 700 μm, the energy density of the battery may be decreased.

In addition, the thickness of the first solid electrolyte layer adjacent to the negative electrode in the solid electrolyte membrane is 10 μm to 400 μm, and when the thickness is within the above range, side reactions at the interface with the negative electrode may be minimized. The thickness of the second solid electrolyte layer formed adjacent to the first solid electrolyte layer may be 10 μm to 500 μm.

In one aspect of the present disclosure, the ionic conductivity of the solid electrolyte membrane may be 0.5 to 10 mS/cm. Specifically, the ionic conductivity may be 0.5 mS/cm or more, 0.6 mS/cm or more. 0.8 mS/cm or more, 1 mS/cm or more, 1.5 mS/cm or more, 1.6 mS/cm or more, 1.7 mS/cm or more, 1.8 mS/cm or more, 1.9 mS/cm or more or 2 mS/cm or more, and may be 3 mS/cm or less, 5 mS/cm or less, 8 mS/cm or less or 10 mS/cm or less. The ionic conductivity may be measured at room temperature (25° C.).

In one aspect of the present disclosure, the tensile strength of the solid electrolyte membrane may be 45 to 1000 kPa. Specifically, the tensile strength may be 45 kPa or more, 50 kPa or more, 80 kPa or more, 100 kPa or more, 120 kPa or more or 150 kPa or more, and may be 200 kPa or less, 300 kPa or less, 500 kPa or less, 700 kPa or less, 900 kPa or less or 1000 kPa or less.

In one aspect of the present disclosure, the solid electrolyte membrane may be solvent-free.

Both the first and second solid electrolyte layers included in the solid electrolyte membrane may be manufactured through a dry process that does not substantially use a solvent and preferably is free of solvent. For example, the first solid electrolyte layer is manufactured through a dry process of physically mixing the first solid electrolyte and the first binder, and thus does not contain any substantial amount of solvent and is preferably free of solvent. In addition, the first fibrous binder formed by fiberizing the first binder by pressure during the dry process is dispersed and entangled with each other, forming a three-dimensional network structure. Accordingly, the first solid electrolyte layer with improved strength may be manufactured by the structure formed by the first fibrous binder formed during the dry process. The second solid electrolyte layer may also be manufactured in the same way. The strength of the solid electrolyte membrane formed by bonding the first solid electrolyte layer and the second solid electrolyte layer prepared in this way may be improved.

In addition, since a separate solvent is preferably not used, it is possible to prevent the solvent from destroying the crystal structure of the sulfide-containing and/or halide-containing solid electrolyte, thereby lowering the ionic conductivity.

Generally, the wet process used to manufacture the solid electrolyte membrane uses a solvent that may dissolve the binder, which is placed between the solid electrolyte particles and causes them to have an adhesive force. The solvent used in the existing wet process is a polar solvent such as N-methyl-2-Pyrrolidone (NMP), water, or ethanol, and such a polar solvent may dissolve the binder and thus is suitable for wet processes. However, since the polar solvent reacts with the sulfide-containing solid electrolyte, it is difficult to use the polar solvent and the sulfide-containing solid electrolyte together. Accordingly, as a solvent for a wet process that may be used with a sulfide-containing solid electrolyte, a solvent such as xylene or anisole that does not react with the sulfide-containing solid electrolyte is used. In addition, in the wet process using solvents such as xylene or anisole, nitrile-butadiene rubber (NBR), styrene ethylene/butylene styrene (SEBS), etc. are used as binders that dissolve in these solvents.

On the other hand, the dry process according to the present disclosure fiberizes the binder in the initial particle form by physically stretching it without using a solvent. Therefore, the structure of the binder in the manufactured solid electrolyte membrane is different from the structure formed by the wet process, and the physical properties of the solid electrolyte membrane may also be improved compared to solid electrolyte membranes manufactured by the wet process. In the above, the binder in the initial particle form is physically transformed by shear force during the mixing step with electrolyte particles. In order to induce this physical transformation, a mortar, ball mill or roll press may be introduced during mixing. In addition, as a binder that may well induce physical deformation, a binder that is physically very weak and fiberizes relatively well, such as PTFE, may be used.

If PTFE is applied to a wet process using a sulfide-containing solid electrolyte, it may not dissolve in solvents such as xylene or anisole, making it difficult to proceed with the wet process.

Method for Manufacturing Solid Electrolyte Membrane

The present disclosure also relates to a method for manufacturing a solid electrolyte membrane.

The method for manufacturing a solid electrolyte membrane according to the present disclosure manufactures a solid electrolyte membrane by preparing the first solid electrolyte layer and the second solid electrolyte layer, respectively, and then joining them.

The first solid electrolyte layer is prepared by the following steps (A1) and (A2):
(A1) mixing first solid electrolyte particles and a first binder; and
(A2) applying the mixture obtained in step (A1) to a calendaring process to form the first solid electrolyte layer.

The second solid electrolyte layer is prepared by the following steps (B1) and (B2):
(B1) mixing a second solid electrolyte and a second binder; and
(B2) applying the mixture obtained in step (B1) to a calendaring process to form the second solid electrolyte layer.

The first binder and the second binder are fiberized during mixing to become the first fibrous binder and the second fibrous binder, respectively.

The weight of the first fibrous binder relative to the total weight of the first solid electrolyte layer is less than the weight of the second fibrous binder relative to the total weight of the second solid electrolyte layer, and the first and second solid electrolyte and the first and second fibrous binder materials and their contents are the same as described herein.

In addition, the first and second binders and the first and second fibrous binders are substantially the same material, with only the shape of the binder being different before and after the dry process.

In addition, the calendaring process refers to a process of forming the material given to the calendaring process into a film shape using two rollers. The pressure applied during the calendaring process may be 5 MPa to 200 MPa.

In one aspect of the present disclosure, the method of bonding the first solid electrolyte layer and the second solid electrolyte layer is not particularly limited as long as it is a bonding method that may form a double layer in a stacked form where the first solid electrolyte layer and the second solid electrolyte layer are adjacent to each other.

For example, the first solid electrolyte layer and the second solid electrolyte layer may be bonded by simply stacking them, or they may be bonded by pressing them after stacking them.

In one aspect of the present disclosure, the temperature of the calendaring process may be 50° C. to 200° C. Specifically, the temperature may be 50° C. or higher, 70° C. or higher, or 80° C. or higher, and may be 100° C. or lower, 120° C. or lower, 140° C. or lower, 160° C. or lower, 180° C. or lower or 200° C. or lower. If the temperature is less than 50° C., the strength of the solid electrolyte membrane may decrease due to less fiberization of the binder. If the temperature exceeds 200° C., the strength of the solid electrolyte membrane may be no longer increased even if the temperature rises, or the electrolyte or the binder material may be deteriorated.

In one aspect of the present disclosure, the calendaring process may be performed for 5 to 50 loops. Specifically, the number of loops may be 5 or more, 8 or more, 10 or more, or 12 or more, and may be 20 or less, 30 or less, 40 or less, or 50 or less. If the number of loops is less than 5, the strength of the solid electrolyte membrane may decrease due to less fiberization of the binder. If the number of loops exceeds 50, the strength of the solid electrolyte membrane may be no longer increased even if the number of loops is increased, or the processability may be deteriorated.

In one aspect of the present disclosure, the orientation of the calendaring process may be performed uniaxially or biaxially. At this time, uniaxial means that the calendaring direction proceeds in one direction, and biaxial means that the calendaring proceeds in one direction and then proceeds alternately in the horizontal and vertical directions of the solid electrolyte membrane.

If the calendaring process is performed biaxially, the fiberization progresses evenly in multiple directions, which may further improve the strength of the solid electrolyte membrane.

All-Solid-State Battery

The present disclosure also relates to an all-solid-state battery comprising the above solid electrolyte membrane.

The all-solid-state battery according to the present disclosure includes the solid electrolyte membrane; a positive electrode formed on one side of the solid electrolyte membrane; and a negative electrode formed on the other side of the solid electrolyte membrane.

As described above, the solid electrolyte membrane comprises the first solid electrolyte layer and the second solid electrolyte layer formed on one side of the first solid electrolyte layer, and the content of the first fibrous binder contained in the first solid electrolyte layer is lower than the content of the second fibrous binder contained in the second solid electrolyte layer. The content of the first fibrous binder may be 1% by weight or less and the content of the second fibrous binder may be 2% by weight or less, so long as the content of the first fibrous binder contained in the first solid electrolyte layer is lower than the content of the second fibrous binder contained in the second solid electrolyte layer.

The all-solid-state battery may be formed by allowing the first solid electrolyte layer, which has a relatively low fibrous binder content, among the first and second solid electrolyte layers comprised in the solid electrolyte membrane, to contact, for instance, directly contact, the negative electrode.

The second solid electrolyte layer has a relatively higher fibrous binder content than the first solid electrolyte layer. The fibrous binders tend to become entangled or connected to each other to form a net-shaped three-dimensional structure. Since the content of the second fibrous binder is high in the second solid electrolyte layer, many net-shaped three-dimensional structures may be formed by the second fibrous binder. If the second solid electrolyte layer comes into contact with the negative electrode, side reactions may occur centered on the net-shaped three-dimensional structure caused by the second fibrous binder at the interface between the second solid electrolyte layer and the negative electrode.

Figure 1B:
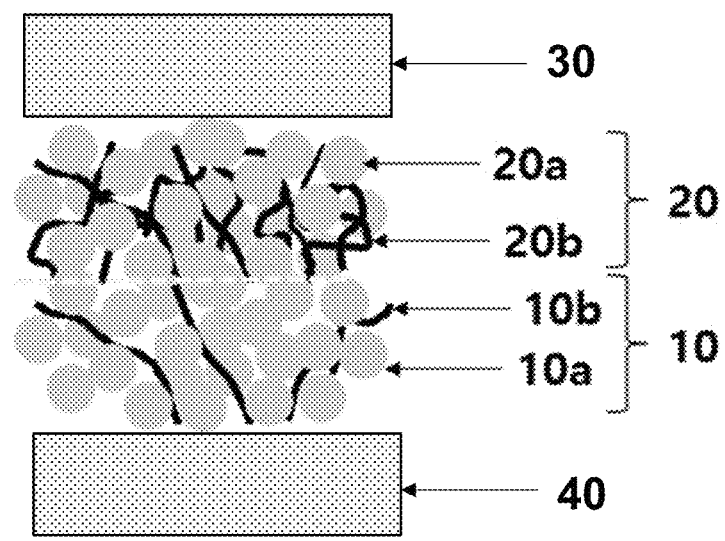
FIG. 1B is a schematic diagram illustrating a longitudinal cross-section of the all-solid-state battery including the solid electrolyte membrane according to an aspect of the present disclosure.

FIG. 1B is a schematic diagram illustrating a longitudinal cross-section of all-solid-state battery including the solid electrolyte membrane according to an aspect of the present disclosure.

Similar to FIG. 1A, in FIG. 1B, the solid electrolyte membrane includes the first solid electrolyte layer 10 and the second solid electrolyte layer 20 formed on one side of the first solid electrolyte layer 10, wherein the first solid electrolyte layer 10 includes the first solid electrolyte 10a and the first fibrous binder 10b, the second solid electrolyte layer 20 includes the second solid electrolyte 20a and the second fibrous binder 20b, and the weight of the first fibrous binder 10b relative to the total weight of the first solid electrolyte layer 10 is less than the weight of the second fibrous binder 20b relative to the total weight of the second solid electrolyte layer 20. In the all-solid-state battery, the solid electrolyte membrane is interposed between the positive electrode 30 and the negative electrode 40, such that the first solid electrolyte layer 10 contacts, for instance, directly contacts, the negative electrode 40.

Therefore, in order to prevent side reactions at the interface between the solid electrolyte membrane and the negative electrode, an all-solid-state battery may be manufactured by ensuring that the first solid electrolyte layer with a lower content of fibrous binder and the negative electrode are adjacent to each other.

In one aspect of the present disclosure, the positive electrode may comprise a positive electrode active material, a conductive material, and a binder.

In the present disclosure, the positive electrode included in the all-solid-state battery comprises a positive electrode active material layer, and the positive electrode active material layer may be formed on one side or both sides of a positive electrode current collector.

The positive electrode active material layer comprises a positive electrode active material, a conductive material, and a binder.

In addition, the positive electrode active material is not particularly limited as long as it is a material capable of reversibly intercalating and de-intercalating lithium ions, and for example, may be, but is not limited to, layered compounds or compounds substituted with one or more transition metals, such as lithium cobalt oxide ($LiCoO_2$), lithium nickel oxide ($LiNiO_2$), $Li[Ni_xCo_yMn_zM_v]O_2$ (wherein, M is any one or two or more elements selected from the group consisting of Al, Ga and In; $0.3 \leq x < 1.0$, $0 \leq y$, $z \leq 0.5$, $0 \leq v \leq 0.1$, $x+y+z+v=1$), $Li(Li_aM_{b-a-b}M'_{b'})O_{2-c}A_c$ (wherein, $0 \leq a \leq 0.2$, $0.6 \leq b \leq 1$, $0 \leq b' \leq 0.2$, $0 \leq c \leq 0.2$; M comprises Mn and at least one selected from the group consisting of Ni, Co, Fe, Cr, V, Cu, Zn and Ti; M' is at least one selected from the group consisting of Al, Mg and B, and A is at least one selected from the group consisting of P, F, S and N); lithium manganese oxide such as Formula $Li_{1+y}Mn_{2-y}O_4$ (wherein, y is 0 to 0.33), $LiMnO_3$, $LiMn_2O_3$, $LiMnO_2$; lithium copper oxide ($Li_2CuO_2$); vanadium oxide such as $LiV_3O_3$, $LiFe_3O_4$, $V_2O_5$, $Cu_2V_2O_7$; Ni site type lithium nickel oxide represented by Formula $LiNi_{1-y}MyO_2$ (wherein, M is Co, Mn, Al, Cu, Fe, Mg, B or Ga, and y is 0.01 to 0.3); lithium manganese composite oxide represented by Formula $LiMn_{2-y}M_yO_2$ (wherein, M is Co, Ni, Fe, Cr, Zn or Ta, and y is 0.01 to 0.1) or $Li_2Mn_3MO_8$ (wherein, M is Fe, Co, Ni, Cu or Zn); $LiMn_2O_4$ in which part of Li in the Formula is substituted with alkaline earth metal ions; disulfide compounds; $Fe_2(MoO_4)_3$.

In addition, the positive electrode active material may be contained in an amount of 60 to 80% by weight based on the total weight of the positive electrode active material layer. Specifically, the content of the positive electrode active material may be 60% by weight or more or 68% by weight or more, and may be 72% by weight or less, 75% by weight or less or 80% by weight or less. If the content of the positive electrode active material is less than 60% by weight, the performance of the battery may be deteriorated. If the content of the positive electrode active material exceeds 80% by weight, mass transfer resistance may be increased.

In addition, the conductive material is not particularly limited as long as it prevents side reactions in the internal environment of the all-solid-state battery, and has excellent electrical conductivity without causing chemical changes in the battery. The conductive material may be typically graphite or conductive carbon, and for example, as the conductive material, graphite such as natural graphite, artificial graphite; carbon black such as carbon black, acetylene black, Ketjen™ black (e.g., pure carbon black), Denka™ black (e.g., acetylene black), thermal black, channel black, furnace black, lamp black; carbon-containing materials whose crystal structure is graphene or graphite; conductive fibers such as carbon fibers and metal fibers; carbon fluoride; metal powders such as aluminum powder and nickel powder; conductive whiskers such as zinc oxide and potassium titanate; conductive oxides such as titanium oxide; and conductive polymers such as polyphenylene derivatives may be used alone or in combination of two or more thereof, but is not necessarily limited thereto. Preferably, the conductive material may include vapor-grown carbon fiber (VGCF).

The conductive material may be generally contained in an amount of 1% by weight to 5% by weight based on the total weight of the positive electrode active material layer, and specifically, the content of the conductive material may be 1% by weight or more, 1.5% by weight or more or 2% by weight or more, and may be 4% by weight or less, 4.5% by weight or less or 5% by weight or less. If the content of the conductive material is too small, i.e., less than 1% by weight, it is difficult to expect an effect of improving electrical conductivity or the electrochemical properties of the battery may be deteriorated. If the content of the conductive material exceeds 5% by weight and thus is too large, the amount of the positive electrode active material may be relatively small, so that the capacity and energy density may be lowered. A method for incorporating the conductive material to the positive electrode is not particularly limited, and a conventional method known in the art, such as mixing with the positive electrode active material or coating on it, may be used.

In addition, the binder is a component that assists in bonding between the positive electrode active material and the conductive material, and assists in bonding to the current collector, and may comprise at least one selected from the group consisting of styrene butadiene rubber, acrylated styrene butadiene rubber, acrylonitrile copolymer, acrylonitrile-butadiene rubber, nitrile butadiene rubber, acrylonitrile-styrene-butadiene copolymer, acrylic rubber, butyl rubber, fluorine rubber, polytetrafluoroethylene, polyethylene, polypropylene, ethylene/propylene copolymer, polybutadiene, polyethylene oxide, chlorosulfonated polyethylene, polyvinyl pyrrolidone, polyvinyl pyridine, polyvinyl alcohol, polyvinyl acetate, polyepichlorohydrin, polyphosphazene, polyacrylonitrile, polystyrene, latex, acrylic resin, phenolic resin, epoxy resin, carboxymethyl cellulose, hydroxypropyl cellulose, cellulose acetate, cellulose acetate butyrate, cellulose acetate propionate, cyanoethyl cellulose, cyanoethyl sucrose, polyester, polyamide, polyether, polyimide, polycarboxylate, polycarboxylic acid, polyacrylic acid, polyacrylate, lithium polyacrylate, polymethacrylic acid, polymethacrylate, polyacrylamide, polyurethane, polyvinylidene fluoride, and poly(vinylidene fluoride)-hexafluoropropene. Preferably, the binder may comprise polytetrafluoroethylene (PTFE).

In addition, the binder may be contained in an amount of 0.5% by weight to 4% by weight based on the total weight of the positive electrode active material layer, and, specifically, the content of the binder may be 0.5% by weight or more, 1% by weight or more or 1.5% by weight or more, and may be 3% by weight or less, 3.5% by weight or less or 4% by weight or less. If the content of the binder is less than 0.5% by weight, the adhesive force between the positive electrode active material and the positive electrode current collector may be lowered. If the content of the binder exceeds 4% by weight, the adhesive force is improved, but the content of the positive electrode active material is reduced by that amount, and thus the capacity of the battery may be lowered.

In addition, the positive electrode current collector supports the positive electrode active material layer, and serves to transfer electrons between the external conductive wire and the positive electrode active material layer.

The positive electrode current collector is not particularly limited as long as it has high electronic conductivity without causing chemical changes in the all-solid-state battery. For example, as the positive electrode current collector, copper, stainless steel, aluminum, nickel, titanium, palladium, sintered carbon; a copper or stainless steel surface-treated with carbon, nickel, silver, etc.; an aluminum-cadmium alloy, etc. may be used.

The positive electrode current collector may have a fine irregularity structure on the surface of the positive electrode current collector or have a three-dimensional porous structure, in order to strengthen the bonding force with the positive electrode active material layer. Accordingly, the positive electrode current collector may include various forms such as a film, a sheet, a foil, a mesh, a net, a porous body, a foam, and a non-woven fabric.

The positive electrode as described above may be prepared by the conventional method, and specifically, the positive electrode may be manufactured by coating and drying a composition for forming the positive electrode active material layer prepared by mixing the positive electrode active material, the conductive material and the binder in an organic solvent, onto the positive electrode current collector, and optionally compression-molding it onto the positive electrode current collector to improve the density of the electrode. At this time, as the organic solvent, it is preferable to use one that may uniformly disperse the positive electrode active material, the binder, and the conductive material and that evaporates easily. Specifically, acetonitrile, methanol, ethanol, tetrahydrofuran, water, isopropyl alcohol and the like are exemplified.

In the present disclosure, the negative electrode included in the all-solid-state battery comprises a negative electrode active material layer, and the negative electrode active material layer may be formed on one side or both sides of a negative electrode current collector. The negative electrode active material layer may contain a negative electrode active material, a binder, and a conductive material.

The negative electrode active material may include a material capable of reversibly intercalating or de-intercalating lithium ion ($Li^+$), a material capable of reversibly forming a lithium-containing compound by reacting with lithium ions, and a lithium metal or a lithium alloy.

The material capable of reversibly intercalating or de-intercalating lithium ion ($Li^+$) may be, for example, crystalline carbon, amorphous carbon or mixtures thereof. The material capable of reacting with lithium ion ($Li^+$) to reversibly form a lithium-containing compound may be, for example, tin oxide, titanium nitrate or silicon. The lithium alloy may be, for example, an alloy of lithium (Li) and the metal selected from the group consisting of indium (In), sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal or lithium-indium alloy (Li—In), and specifically, may be in the form of lithium metal or lithium and a thin film or a lithium-indium alloy thin film or powder.

The negative electrode active material may be contained in an amount of 40 to 80% by weight based on the total weight of the negative electrode active material layer. Specifically, the content of the negative electrode active material may be 40% by weight or more or 50% by weight or more, and may be 70% by weight or less or 80% by weight or less. If the content of the negative electrode active material is less than 40% by weight, the connectivity between the wet negative electrode active material layer and the dry negative electrode active material layer may be insufficient. If the content of the negative electrode active material exceeds 80% by weight, mass transfer resistance may be increased.

In addition, the binder is the same as described above for the positive electrode active material layer.

In addition, the conductive material is the same as described above for the positive electrode active material layer.

In addition, the negative electrode current collector is not particularly limited as long as it has conductivity without causing chemical change in the battery, and for example, the negative electrode current collector may be copper, stainless steel, aluminum, nickel, titanium, sintered carbon; copper or stainless steel surface-treated with carbon, nickel, titanium, silver, etc.; or aluminum-cadmium alloy. In addition, the negative electrode current collector may be used in various forms, such as a film having a fine irregularity structure on its surface, a sheet, a foil, a net, a porous body, a foam, and a non-woven fabric, as in the positive electrode current collector.

The manufacturing method of the negative electrode is not particularly limited, and may be manufactured by forming a negative electrode active material layer on a negative electrode current collector using a layer or film formation method commonly used in the art. For example, a method such as pressing, coating, or vapor deposition may be used. Also, a case where a thin film of a metal lithium is formed on a metal plate by initial charging after assembling the battery without a lithium thin film on the negative electrode current collector is also included in the negative electrode of the present disclosure.

Method for Manufacturing all-Solid-State Battery

The present disclosure also relates to a method for manufacturing an all-solid-state battery.

The method for manufacturing an all-solid-state battery according to the present disclosure includes the steps of (P1) forming a positive electrode on one side of the solid electrolyte membrane by placing a mixture for forming a positive electrode active material layer on one side of the solid electrolyte membrane and pressurizing it; and (P2) placing a negative electrode on the other side of the solid electrolyte membrane and pressurizing it. In this case, the solid electrolyte membrane includes the first solid electrolyte layer and the second solid electrolyte layer formed on one side of the first solid electrolyte layer, and the content of the first fibrous binder contained in the first solid electrolyte layer is low compared to the content of the second fibrous binder contained in the second solid electrolyte layer.

The all-solid-state battery may be manufactured by ensuring that the first solid electrolyte layer comprised in the solid electrolyte membrane and the negative electrode are adjacent to each other. In this case, since the content of the first fibrous binder included in the first solid electrolyte layer is low, that is, 1% by weight or less, the side reactions at the interface between the first solid electrolyte layer and the negative electrode may be prevented.

In the step (P1), the mixture for forming a positive electrode active material layer may be placed on one side of the solid electrolyte membrane and pressurized at high temperature to form a positive electrode on one side of the solid electrolyte membrane.

The mixture for forming the positive electrode active material layer may include a positive electrode active material, a conductive material, and a binder. Their specific types and weights are as described herein. In addition, the positive electrode may be manufactured by forming the positive electrode active material layer and then attaching the current collector.

In addition, the pressurizing process is intended to bond the solid electrolyte membrane and the positive electrode by reducing the interface resistance, and may be performed at a pressure of 300 MPa to 500 MPa. The pressure of the pressurizing process at the high temperature may be 300 MPa or more, 350 MPa or more, or 400 MPa or more, and may be 450 MPa or less, 460 MPa or less, or 470 MPa or less. If the temperature and/or pressure of the pressurizing process at the high temperature is below the above range, the solid electrolyte membrane and the positive electrode may not be integrated. If the temperature and/or pressure of the pressurizing process at the high temperature exceeds the above range, the solid electrolyte membrane or the positive electrode may be deformed or damaged.

In the step (P2), the all-solid-state battery may be manufactured by placing the negative electrode on the other side of the solid electrolyte membrane and pressurizing it. The description of the negative electrode is the same as described above.

The pressure during pressurization may be 40 MPa to 80 MPa. Specifically, the pressure during pressurization may be 40 MPa or more, 45 MPa or more, or 50 MPa or more, and may be 70 MPa or less, 75 MPa or less, or 80 MPa or less. If the pressure during pressurization is less than 40 MPa, the interface resistance between the negative electrode and the solid electrolyte membrane may be increased. If the pressure during pressurization exceeds 80 MPa, the solid electrolyte or the negative electrode may be deformed or damaged.

Since the all-solid-state battery manufactured in this way contains a thin solid electrolyte, the manufacturing cost may be reduced and ion conductance and energy density may be improved.

In addition, since the solid electrolyte and the positive electrode are integrated through a pressurizing process at high temperature, interfacial stability may be improved.

Battery Module

The present disclosure also relates to a battery module including the all-solid-state battery as a unit cell, a battery pack including the battery module, and a device including the battery pack as a power source.

In this case, a specific example of the device may be a power tool powered by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system, but is not limited thereto.

Hereinafter, preferred examples are presented to help the understanding of the present disclosure. However, the following examples are merely illustrative of the present disclosure, and it is obvious to those skilled in the art that various changes and modifications are possible within the scope and spirit of the present disclosure, and it is natural that these changes and modifications fall within the scope of the appended claims.

In the following Examples and Comparative Examples, a solid electrolyte membrane and an all-solid-state battery were manufactured according to the composition and process as shown in Tables 1-1 and 1-2 below.

TABLE 1-1

| | First solid electrolyte layer | | | |
|---|---|---|---|---|
| | First solid electrolyte | | First binder | |
| | Material | Content (% by weight) | Material | Content (% by weight) |
| Example 1 | $Li_6PS_5Cl$ | 99.8 | PTFE | 0.2 |
| Example 2 | $Li_6PS_5Cl$ | 99.8 | PTFE | 0.2 |
| Example 3 | $Li_6PS_5Cl$ | 99.8 | PTFE | 0.2 |
| Comparative Example 1 (wet) | $Li_6PS_5Cl$ | 99.8 | PTFE | 0.2 |
| Comparative Example 2 (wet) | $Li_6PS_5Cl$ | 98 | SEBS | 2 |
| Comparative Example 3 | $Li_6PS_5Cl$ | 99.8 | PTFE | 0.2 |
| Comparative Example 4 | — | — | — | — |
| Comparative Example 5 | — | — | — | — |

TABLE 1-2

| | Second solid electrolyte layer | | | | |
|---|---|---|---|---|---|
| | Second solid electrolyte | | Second binder | | |
| | Material | Content (% by weight) | Material | Content (% by weight) | Thickness (μm) |
| Example 1 | $Li_6PS_5Cl$ | 99.5 | PTFE | 0.5 | 600 |
| Example 2 | $Li_6PS_5Cl$ | 98 | PTFE | 2 | 600 |
| Example 3 | $Li_6PS_5Cl$ | 98 | PTFE | 2 | 600 |
| Comparative Example 1 (wet) | $Li_6PS_5Cl$ | 99.5 | PTFE | 0.5 | impossible to manufacture |
| Comparative Example 2 (wet) | — | — | — | — | 50 |
| Comparative Example 3 | — | — | — | — | 200 |
| Comparative Example 4 | $Li_6PS_5Cl$ | 99.5 | PTFE | 0.5 | 400 |
| Comparative Example 5 | $Li_6PS_5Cl$ | 98 | PTFE | 2 | 400 |

Example 1

1-1. Manufacture of First and Second Solid Electrolyte Layers

The first and second solid electrolyte layers were prepared by a dry process without using a solvent as follows.

The mixture obtained by mixing $Li_6PS_5Cl$ powder, which is a sulfide-containing solid electrolyte, as a first solid electrolyte, with PTFE particles (polytetrafluoroethylene, Chemours) which is a first binder, in a mortar, was subjected to a calendaring loop 30 times with a roll press under the conditions of a temperature of 90° C., a pressure of 50 MPa and a biaxial orientation to produce a first solid electrolyte layer with a thickness of 200 μm. The first solid electrolyte and the first binder were mixed in amounts of 99.8% by weight and 0.2% by weight, respectively.

The mixture obtained by mixing $Li_6PS_5Cl$ powder, which is a sulfide-containing solid electrolyte, as a second solid electrolyte, with PTFE particles (polytetrafluoroethylene, Chemours) which is a second binder, in a mortar, was subjected to a calendaring loop 30 times with a roll press under the conditions of a temperature of 90° C., a pressure of 20 MPa and a biaxial orientation to produce a second solid electrolyte layer with a thickness of 400 μm. The second solid electrolyte and the second binder were mixed in amounts of 99.5% by weight and 0.5% by weight, respectively.

1-2. Manufacture of Solid Electrolyte Membrane

A solid electrolyte membrane was manufactured by stacking the second solid electrolyte layer on one side of the first solid electrolyte layer and bonding it under a 5 MPa uniaxial pressure. The thickness of the solid electrolyte membrane is 600 μm.

1-3. Manufacture of all-Solid-State Battery

An all-solid-state battery was manufactured by sequentially stacking a positive electrode (NCM811, LGChem), the solid electrolyte membrane manufactured in 1-2 above, and a negative electrode (Si powder, Alfa Aesar). In this case, the first solid electrolyte layer of the solid electrolyte membrane was brought into contact with the negative electrode.

Example 2

A solid electrolyte membrane and an all-solid-state battery were manufactured in the same manner as Example 1, except that the second solid electrolyte and the second binder were mixed in amounts of 98% by weight and 2% by weight, respectively, and the calendaring loop was performed 5 times.

Example 3

A solid electrolyte membrane and an all-solid-state battery were manufactured in the same manner as Example 1, except that when producing the first solid electrolyte layer, the calendaring loop was performed 5 times.

Comparative Example 1

A solid electrolyte membrane and an all-solid-state battery were manufactured in the same manner as Example 1, except that the first and second solid electrolyte layers were manufactured by a wet process using a solvent as shown below.

For the wet process, xylene solvent, which is stable to sulfide-containing solid electrolyte, was used.

To attempt to prepare the first solid electrolyte layer, a solution was prepared by dissolving PTFE particles, as the first binder, in xylene solvent at a concentration of 5% by weight. The prepared solution was mixed with $Li_6PS_5Cl$ powder which is a sulfide-containing solid electrolyte as the first solid electrolyte, to obtain a mixture. Relative to each other (without accounting for the solvent), the first solid electrolyte ($Li_6PS_5Cl$ powder) and the first binder (PTFE particles) were present in amounts of 99.8% by weight and 0.2% by weight, respectively, the same as in Example 1.

It was found not possible to manufacture a solid electrolyte membrane including the first solid electrolyte layer and the second solid electrolyte layer prepared by the wet process in Comparative Example 1. This was due to PTFE, as the first (and second) binder, having the property of being soluble in the xylene solvent. Therefore, it was not possible to manufacture in the form of a film.

Comparative Example 2

A single-layer solid electrolyte membrane was manufactured by a wet process.

98% by weight of $Li_6PS_5Cl$ as a sulfide-containing solid electrolyte and 2% by weight of SEBS (styrene-ethylene-butylene-styrene) as a binder were mixed with xylene as a solvent to prepare a slurry. At this time, the concentration of the slurry was set to 60% by weight of the sulfide-containing solid electrolyte and 40% by weight of the solvent.

The slurry was coated on a PET (polyethylene terephthalate) release film with a doctor blade and dried at a temperature of 80° C. The resulting single-layer solid electrolyte membrane had a thickness of 50 μm.

Comparative Example 3

As a solid electrolyte membrane, only the first solid electrolyte layer prepared in Example 1 was used.

Comparative Example 4

As a solid electrolyte membrane, only the second solid electrolyte layer prepared in Example 1 was used.

Comparative Example 5

As a solid electrolyte membrane, only the second solid electrolyte layer prepared in Example 2 was used.

Experimental Example 1: Measurement of Ionic Conductivity of Solid Electrolyte Membrane In order to confirm the ionic conductivity according to the content of the binder contained in the solid electrolyte membrane and the shape of the solid electrolyte membrane, ionic conductivity was measured in the following manner.

In order to measure the ionic conductivity of the solid electrolyte membrane, the solid electrolyte membrane was placed in a polyether ether ketone (PEEK) holder with a diameter of 10 mm, and ionic conductivity was measured using a titanium rod as a blocking electrode.

After measuring resistance using an electrochemical impedance spectrometer (EIS, VM3, Bio Logic Science Instrument) at 25° C. under conditions of amplitude 10 mV and scan range from 1 Hz to 0.1 MHz, the ionic conductivity of the solid electrolyte membrane was calculated using Equation 1 below.

$$\sigma_i = \frac{L}{RA} \quad \text{[Equation 1]}$$

wherein, $\sigma_1$ is the ionic conductivity (mS/cm) of the solid electrolyte membrane, R is the resistance (Ω) of the solid electrolyte membrane measured with the electrochemical impedance spectrometer, L is the thickness (μm) of the solid electrolyte membrane, and A refers to the area (cm²) of the solid electrolyte membrane.

The measured ionic conductivity values are listed in Table 2 below.

TABLE 2

|  | Ionic conductivity (mS/cm) |
|---|---|
| Example 1 | 1.952 |
| Example 2 | 1.548 |
| Example 3 | 1.532 |
| Comparative Example 1 | — |
| Comparative Example 2 | 1.089 |
| Comparative Example 3 | 2.125 |

TABLE 2-continued

| | Ionic conductivity (mS/cm) |
|---|---|
| Comparative Example 4 | 1.865 |
| Comparative Example 5 | 1.26 |

Referring to Table 2 above, as can be seen from the measured values of ionic conductivity in Examples 1 to 3, in a state where the content of the first binder is set to be less than that of the second binder, the content of the first binder was the same, but the content of the second binder was the least in Example 1, and accordingly, the ionic conductivity of Example 1 was the highest.

In addition, Comparative Example 1 attempted to manufacture a solid electrolyte membrane including the first solid electrolyte layer and the second solid electrolyte layer by a wet process, but since PTFE, as the first and second binder, has the property of being soluble in xylene solvent, it was not manufactured in the form of a film, and thus it is impossible to measure the ionic conductivity.

In addition, it was confirmed that Comparative Example 2 used SEBS as a binder, which is insoluble in xylene solvent, but the solid electrolyte membrane was manufactured by a wet process using a relatively large amount of binder at 2% by weight, and thus the ionic conductivity was relatively lower than Examples 1 to 3.

In addition, Comparative Example 3 showed that a solid electrolyte membrane, which is the first solid electrolyte layer manufactured by dry process in Example 1 (calendaring loops 30 times) had low content of the first binder at 0.2% by weight, and that since it was in a single layer form, the ionic conductivity was higher than that of Example 1. However, since the solid electrolyte membrane is in a single-layer form, it can be predicted that its strength will be weaker than that of Example 1, which is in a double-layer form.

In addition, Comparative Example 4 showed that a solid electrolyte membrane, which is the second solid electrolyte layer manufactured by dry process in Example 1 (calendaring loops 30 times) had low content of the second binder at 0.5% by weight, and that since it was in a single-layer form, the ionic conductivity was high at a similar level to Example 1. However, since the solid electrolyte membrane was in a single-layer form, it can be predicted that its strength will be weaker than that of Example 1, which is in a double-layer form.

In addition, Comparative Example 5 showed that a solid electrolyte membrane, which is the second solid electrolyte layer manufactured by dry process in Example 2 (calendaring loops 5 times) had higher content of the second binder at 2% by weight, and thus the ionic conductivity was somewhat low. Further, since the solid electrolyte membrane was in a single-layer form, it can be predicted that its strength will be weaker than that of Example 2, which is in a double-layer form.

From these, it can be seen that the ionic conductivity of the solid electrolyte membrane is greatly affected by the content of the binder. However, in order for the solid electrolyte membrane to exhibit appropriate ionic conductivity and a level of strength suitable for an all-solid-state battery, a double-layer form is more appropriate than a single-layer form.

Experimental Example 2: Evaluation of Cycle Characteristics of all-Solid-State Battery The cycle characteristics of the all-solid-state battery manufactured in Example 1 were evaluated. The all-solid-state battery manufactured in Example 1 is a full cell that includes a negative electrode (Si), a double-layer solid electrolyte membrane (Bilayer SSE-2), and a positive electrode (NCM:LPSCL:VGCF=66:31:3 (wt %)).

In the method of evaluating the cycle characteristics of the all-solid-state battery, the discharging capacity was measured up to the third cycle to evaluate the maintenance rate of discharging capacity, by charging and discharging at room temperature under a constant loading amount of the positive electrode, a constant current rate (C rate), and a constant capacity ratio (N/P Ratio) of the negative electrode/positive electrode.

Figure 2:
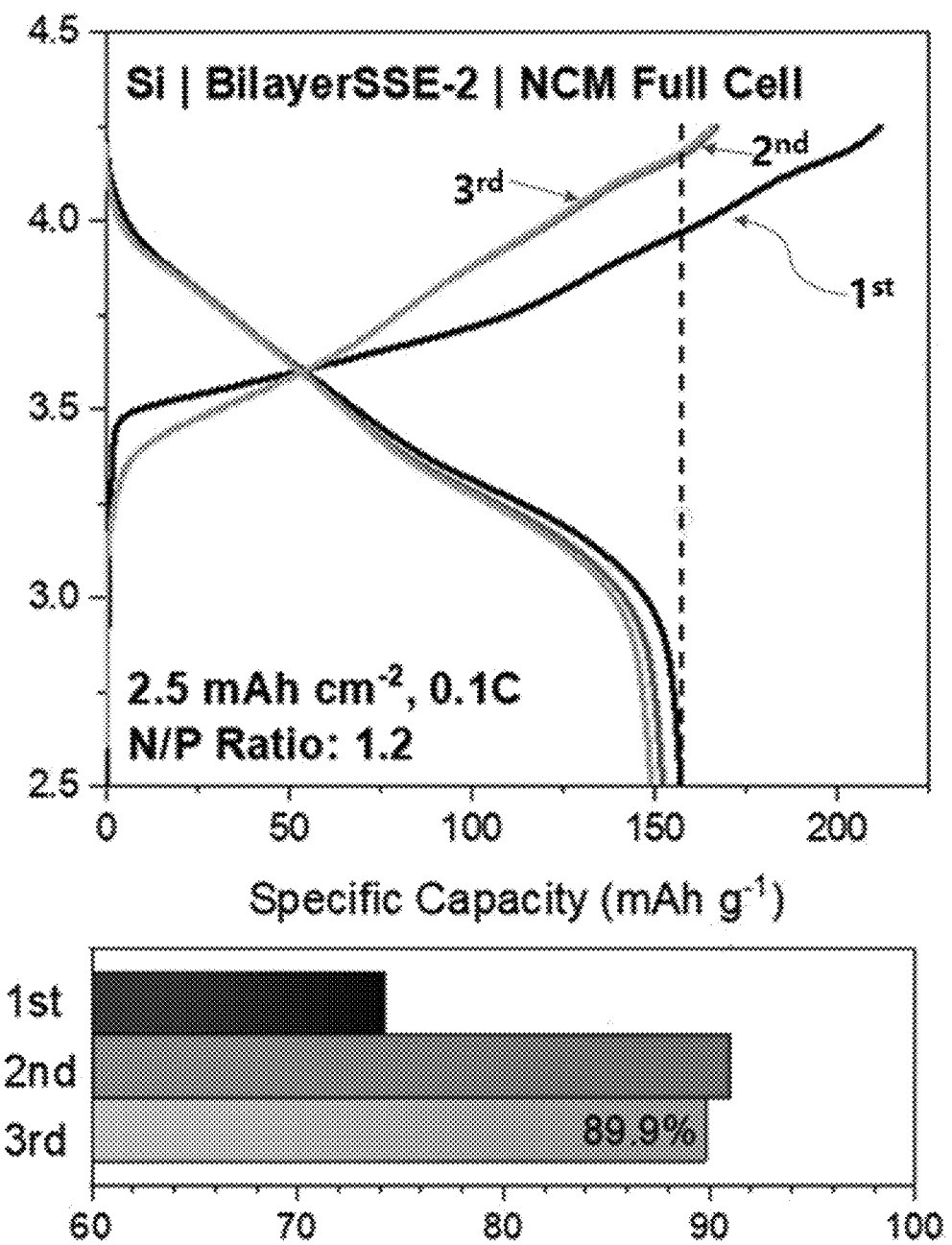
FIG. 2 is a graph illustrating the results of an experiment on the discharging capacity of the all-solid-state battery manufactured in Example 1.

FIG. 2 is a formation cycle charging/discharging curve for the all-solid-state battery manufactured in Example 1 (positive electrode loading: 2.5 mAh·cm$^{-2}$; C rate: 0.1C; N/P Ratio: 1.2).

Referring to FIG. 2, it can be seen that the maintenance rate of discharging capacity of the all-solid-state battery manufactured in Example 1 is high.

In the above, although the present disclosure has been described by way of limited examples and drawings, the present disclosure is not limited thereto, and it is apparent that various modifications and variations can be made by those skilled in the art to which the present disclosure pertains within the equivalent scope of the technical spirit of the present disclosure and the claims to be described below.

DESCRIPTION OF SYMBOL

1: Solid electrolyte membrane
10: First solid electrolyte layer
10a: First solid electrolyte
10b: First fibrous binder
20: Second solid electrolyte layer
20a: Second solid electrolyte
20b: Second fibrous binder
30: positive electrode
40: negative electrode

The invention claimed is:

1. A solid electrolyte membrane, comprising:
a first solid electrolyte layer; and
a second solid electrolyte layer on one side of the first solid electrolyte layer,
wherein the first solid electrolyte layer comprises a first solid electrolyte and a first fibrous binder, wherein a weight of the first fibrous binder is 0.1% by weight to 0.4% by weight based on a total weight of the first solid electrolyte layer,
wherein the second solid electrolyte layer comprises a second solid electrolyte and a second fibrous binder, wherein a weight of the second fibrous binder is 0.2 to 0.9% by weight based on a total weight of the second solid electrolyte layer,
wherein the weight of the first fibrous binder relative to the total weight of the first solid electrolyte layer is less than the weight of the second fibrous binder relative to the total weight of the second solid electrolyte layer,
wherein the first fibrous binder and the second fibrous binder each independently comprise at least one selected from the group consisting of polytetrafluoroethylene (PTFE), ethylene-vinyl acetate (EVA), styrene-ethylene-butylene-styrene (SEBS) and copolymers thereof,
wherein a thickness of the solid electrolyte membrane is 20 μm to 700 μm, and
wherein no solvent is used in the preparation of the first and second solid electrolyte layers.

2. The solid electrolyte membrane according to claim 1, wherein the weight of the first fibrous binder is 0.2% by weight to 0.3% by weight based on the total weight of the first solid electrolyte layer.

3. The solid electrolyte membrane according to claim 1, wherein the weight of the second fibrous binder is 0.5 to 0.7% by weight based on the total weight of the second solid electrolyte layer.

4. The solid electrolyte membrane according to claim 1, wherein the first fibrous binder and the second fibrous binder each independently comprise at least one selected from the group consisting of ethylene-vinyl acetate (EVA), styrene-ethylene-butylene-styrene (SEBS) and copolymers thereof.

5. The solid electrolyte membrane according to claim 1, wherein the first solid electrolyte or the second solid electrolyte is a sulfide-containing solid electrolyte, a halide-containing solid electrolyte, or an oxide-containing solid electrolyte.

6. The solid electrolyte membrane according to claim 1, wherein a thickness of the solid electrolyte membrane is 600 µm.

7. The solid electrolyte membrane according to claim 1, wherein an ionic conductivity of the solid electrolyte membrane is 0.5 mS/cm to 10 mS/cm.

8. The solid electrolyte membrane according to claim 1, wherein the solid electrolyte membrane is solvent-free.

9. A method for manufacturing a solid electrolyte membrane according to claim 1, comprising:
manufacturing the first solid electrolyte layer and the second solid electrolyte layer, respectively, and then bonding the first solid electrolyte layer and the second solid electrolyte layer,
wherein the first solid electrolyte layer is prepared by the following steps (A1) and (A2):
(A1) mixing first solid electrolyte particles and a first binder; and
(A2) applying a mixture obtained in step (A1) to a calendaring process to form the first solid electrolyte layer,
wherein the second solid electrolyte layer is prepared by the following steps (B1) and (B2):
(B1) mixing second solid electrolyte particles and a second binder; and
(B2) applying the mixture obtained in step (B1) to a calendaring process to form the second solid electrolyte layer,
wherein the first binder and the second binder are fiberized during mixing to become the first fibrous binder and the second fibrous binder, respectively, and
wherein the weight of the first fibrous binder relative to the total weight of the first solid electrolyte layer is less than the weight of the second fibrous binder relative to the total weight of the second solid electrolyte layer.

10. The method for manufacturing the solid electrolyte membrane according to claim 9, wherein a temperature of the calendaring process is 50° C. to 200° C.

11. The method for manufacturing the solid electrolyte membrane according to claim 9, wherein the calendaring process is performed over 5 to 50 loops.

12. The method for manufacturing the solid electrolyte membrane according to claim 9, wherein the calendaring process is performed uniaxially or biaxially.

13. An all-solid-state battery comprising a positive electrode, a negative electrode and the solid electrolyte membrane of claim 1 interposed between them.

14. The all-solid-state battery according to claim 13, wherein the first solid electrolyte layer of the solid electrolyte membrane is adjacent to the negative electrode.

15. The solid electrolyte membrane according to claim 1, wherein the first solid electrolyte layer consists of the first solid electrolyte and the first fibrous binder, and the second solid electrolyte layer consists of the second solid electrolyte and the second fibrous binder.

16. The solid electrolyte membrane according to claim 1, wherein the first binder and the second binder are fiberized in a calendaring process to become the first fibrous binder and the second fibrous binder, respectively.

17. The solid electrolyte membrane according to claim 1, wherein the first fibrous binder and the second fibrous binder comprise polytetrafluoroethylene (PTFE), and wherein the first solid electrolyte and the second solid electrolyte comprise $Li_6PS_5Cl$.

18. A method for manufacturing a solid electrolyte membrane according to claim 1, comprising:
(1) preparing a first solid electrolyte layer by (a1) mixing first solid electrolyte particles and a first binder, wherein the first binder is fiberized during mixing to become a first fibrous binder, and then (a2) applying the mixture obtained in (a1) to a calendaring process to form the first solid electrolyte layer;
(2) preparing a second solid electrolyte layer, by (b1) mixing second solid electrolyte particles and a second binder, wherein the second binder is fiberized during mixing to become a second fibrous binder, and then (b2) applying the mixture obtained in (b1) to a calendaring process to form the second solid electrolyte layer,
(3) bonding the first solid electrolyte layer prepared in (1) and the second solid electrolyte layer prepared in (2),
wherein a weight of the first fibrous binder relative to a total weight of the first solid electrolyte layer is less than a weight of the second fibrous binder relative to a total weight of the second solid electrolyte layer, and
wherein no solvent is used in the preparation of the first and second solid electrolyte layers.

19. The method for manufacturing the solid electrolyte membrane according to claim 18, wherein the weight of the first fibrous binder is 1% by weight or less based on the total weight of the first solid electrolyte layer and wherein the weight of the second fibrous binder is 0.2 to 2% by weight based on the total weight of the second solid electrolyte layer.

20. The method for manufacturing the solid electrolyte membrane according to claim 18, wherein a thickness of the solid electrolyte membrane is 20 µm to 700 µm.

* * * * *